United States Patent
Chung et al.

Patent Number: 6,080,441
Date of Patent: Jun. 27, 2000

[54] LEAVENING ACID COMPOSITION

[75] Inventors: Frank H. Y. Chung, Langhorne, Pa.; Thomas E. Edging, Murfeesboro, Tenn.

[73] Assignee: Rhodia Inc., Cranbury, N.J.

[21] Appl. No.: 09/074,788

[22] Filed: May 8, 1998

[51] Int. Cl.$^7$ ..................................................... A21D 2/02
[52] U.S. Cl. .................... 426/563; 426/551; 426/562; 426/561
[58] Field of Search .................................... 426/551, 549, 426/561, 563, 562, 465

[56] References Cited

U.S. PATENT DOCUMENTS

| | | | |
|---|---|---|---|
| 2,160,232 | 5/1939 | Schlaeger | 23/108 |
| 2,160,700 | 5/1939 | Knox | 23/109 |
| 2,263,487 | 11/1941 | Cox et al. | 99/95 |
| 2,272,617 | 2/1942 | Cox et al. | 23/108 |
| 2,314,090 | 3/1943 | Huff | 99/95 |
| 3,109,738 | 11/1963 | Tucker | 99/94 |
| 3,954,939 | 5/1976 | Edging | 423/311 |
| 4,838,922 | 6/1989 | Green | 71/34 |
| 5,554,404 | 9/1996 | Chung | 426/551 |

OTHER PUBLICATIONS

"Chemical Leavening Agents", Kirk–Othmer Encyclopedia of Chemical Technology–4$^{th}$, Ed. vol. No. 3, Frank H. Y. Chung, pp. 893–902, 1992.

*Primary Examiner*—Keith D. Hendricks
*Attorney, Agent, or Firm*—John A. Shedden

[57] ABSTRACT

A composition of matter useful as a leavening acid produced by heating anhydrous monocalcium phosphate for a suitable time and at a suitable temperature so that the resulting composition contains between about 25 and about 72 percent by weight of $P_2O_7$ is provided.

21 Claims, No Drawings

LEAVENING ACID COMPOSITION

BACKGROUND OF THE INVENTION

1. Field of the Invention

The present invention relates to leavening acid compositions for baked goods and more particularly the composition produced by heating anhydrous monocalcium phosphate for a time and temperature suitable to enable it to have excellent control release properties.

2. Technology Description

Chemical leavening systems have been known for over 100 years. The replacement of yeast to induce the process of fermentation by a carbonate alkali which is subjected to the neutralizing action of an acid has reduced the amount of time and materials required for the preparation of baked goods. From this early beginning various leavening systems have been invented and sold as baking powders which contain not only the leavening alkali and the acid employed to neutralize the acid, but also fillers which enabled convenient measurement, handling and storage of such baking powders.

Leavening systems have long been known to comprise two basic ingredients. The first, of course, is the leavening acid such as cream-of-tartar, various phosphoric acids such as orthophosphoric acid, pyrophosphoric acid and the partial salts thereof such as monocalcium phosphate, sodium acid pyrophosphate, and any other suitable, edible, non-toxic acid which would not impart an undesirable taste to the resultant baked goods. Such acids have been known as "acidulants", or "baking acids" but more commonly as "leavening acids".

When added to a moist batter or dough, the acid reacts with a carbon dioxide liberating compound included in the batter or dough to yield the gas necessary for leavening. The rate of gas evolution is an important consideration determining largely the volume, density and texture qualities which will be imparted to the final baked product. This rate must occur within rather narrow limits for some applications such as in the preparation of prepared, canned dough for biscuits. Also, leavening requirements differ widely among the various baked goods for each of these demands a particular speed of evolution to ensure highest quality products. One of the principal factors with respect to the speed of evolution of carbon dioxide is the reactivity of the carbon dioxide producing material.

It is a primary objective when using leavening acids to modulate and control the carbon dioxide liberation kinetics to yield a suitable final baked good product. More particularly, it is desirable to limit the reactive effect of water with the leavening acid. Ideally, the leavening acid would be designed so that it would not be reactive at the time of kneading or cold storing of the dough but would be reactive during heating, where the leavening of the final product takes place.

Particularly useful leavening acids are phosphate materials, and more specifically monocalcium phosphate. This acid is considered desirable as a commercial candidate as it does not possess sodium and has no aftertaste. While monocalcium phosphate does not possess sodium it has been difficult to adequately control its reaction rate which results in the release of carbon dioxide bases at various stages during the baking cycle. The fundamental problem with the use of monocalcium phosphate is that it liberates gas at too fast a desired rate. As a result, its commercial use has generally been limited to being a part of a leavening acid blend. Such blends can be less than optimal because they either may contain sodium, for example blends of monocalcium phosphate with sodium aluminum phosphate or sodium pyrophosphate, or may not have a completely bland taste.

It has been known to regulate the speed of carbon dioxide evolution by control of the reactivity of the leavening acid. Numerous attempts to control the speed of reaction of the leavening acid are known in the art. Typical examples include U.S. Pat. No. 3,034,899 to Tucker wherein a finely divided calcium salt is combined with the acid to control the speed of reaction.

Calcium salts have been employed in chemical leavening systems from its earliest days. A typical example of such use is found in U.S. Pat. No. 315,831 to Peters. However, such calcium salts as taught in Peters are relatively slow acting and have not provided satisfactory performance as the carbonate factor particularly in comparison with the alkali metal salts. Although calcium salts such as calcium carbonate have been employed for various purposes such as preservatives for the leavening acid, etc. as noted in U.S. Pat. Nos. 4,388,336 and 4,526,801, such carbonates do not provide the reactivity desired for a carbonate factor in baked goods.

The use of so-called "coated" monocalcium phosphate where the monocalcium phosphate has a thin coating of phosphate surrounding its acid core is known in the art. However, the "coating" does not provide the reaction kinetics that is ideally preferred and typically can only be used as part of a blend composition. Such materials are disclosed in U.S. Pat. No. 2,160,232. To produce the coated materials, the starting monocalcium phosphate material is subjected to heat treatment at a temperature above about 140° C. The reference further states that the materials should not be heated to above 230° C. as it is alleged that this can cause rapid conversion of leavening acid to a pyrophosphate form. The reference further suggests that the neutralizing value, i.e., the amount of sodium bicarbonate which is completely neutralized by 100 parts by weight of the acid phosphate, of the acids so produced is between about 83 and 88. While this technology has improved the controlled reactivity of the monocalcium phosphate its performance is inferior as compared to sodium containing leavening acids such as sodium acid pyrophosphate and sodium aluminum phosphate.

U.S. Pat. No. 2,160,700 discloses that anhydrous monocalcium phosphate can be prepared by crystallization from an acid solution. A preferred method of preparing crystalline anhydrous monocalcium phosphate is also disclosed in this patent. In the method, a slight excess of lime is added to a relatively concentrated phosphoric acid solution to spontaneously produce a reaction temperature in excess of 140° C. The temperature is controlled in a range above 140° C. but below a temperature at which substantial amounts of pyrophosphate form. The temperature is usually controlled by the rate of lime addition. The reaction is continued until a substantially dry mass of solid anhydrous monocalcium phosphate is produced.

U.S. Pat. No. 2,314,090 is directed to a method for producing calcium acid pyrophosphate by reacting lime with phosphoric acid to yield a resulting material having an acid pyrophosphate content of greater than 90 percent.

U.S. Pat. No. 3,109,738 is directed to a leavening acid composition which is a mixture of sodium aluminum phosphate and anhydrous monocalcium phosphate. This composition demonstrates excellent release properties but requires the use of a sodium containing acid.

U.S. Pat. No. 3,954,939 is directed to a monocalcium phosphate having reduced caking tendencies by admixing water with a monocalcium phosphate composition having a loss on ignition between about 14 and about 17%, permitting the water and monocalcium phosphate to remain in contact for a sufficient length of time to form a hydrated monocalcium phosphate composition with a loss on ignition between 17 and 21.5%, and drying the monocalcium phosphate composition to a free moisture content below 1% and preferably below about 0.5% if the admixture has a free moisture content above this level.

Commonly owned U.S. Pat. No. 5,554,404 is directed to leavening acid compositions and their use in baking applications having a neutralizing value of between 44 and 63. The composition is produced by heating monocalcium phosphate to between about 200° C. to about 310° C. for between 0.25 and about 30 hours. It would still be desirable to yield a composition having a higher neutralizing value for more diversified commercial applicability.

Commonly owned U.S. Pat. No. 5,667,836 is directed to a method for producing a leavening acid composition by heating monocalcium phosphate to elevated temperatures wherein the weight of the resulting composition after heat treatment is 83 to 93 percent by weight of the starting monocalcium phosphate. While this method is able to produce a composition having a higher neutralizing value (i.e., up to about 80), it does so when utilizing a monocalcium phosphate monohydrate starting material. It has been subsequently discovered, and is the basis for the present application, that when utilizing an anhydrous monocalcium phosphate starting material excellent performance can be obtained with an even smaller weight loss as is claimed in U.S. Pat. No. 5,667,836 (i.e., a weight loss during processing of between about 1 to about 7 percent, more preferably between about 1 to about 4 percent can be obtained in accordance with the present invention).

Accordingly, it would be desirable to produce a leavening acid derived from anhydrous monocalcium phosphate whose release rate properties can be tightly controlled for optimal use for a multiple of baking applications.

BRIEF SUMMARY OF THE INVENTION

In accordance with the present invention, leavening acid compositions which have excellent controlled release properties for reaction with leavening bases during various stages in the baking of baked goods are provided. The acid compositions are heat-treated anhydrous monocalcium phosphate compositions which are characterized by specific acid pyrophosphate content, loss on ignition performance and neutralizing value.

One embodiment of the present invention comprises a composition of matter useful as a leavening acid produced by heating anhydrous monocalcium phosphate for a suitable time and at a suitable temperature so that the resulting composition contains between about 25 and about 72 percent by weight of $P_2O_7$.

The inventive composition has a loss on ignition of between about 7 and about 14 and a neutralizing value ranging between about 50 and about 80.

To produce the inventive monocalcium phosphate of the present invention, a sample of anhydrous monocalcium phosphate is heated to an elevated temperature for a period of time suitable to yield a material having the above profile. This typically is accomplished by heating anhydrous monocalcium phosphate to between about 200° C. and about 310° C. for between 0.25 hours to about 30 hours.

In particularly preferred embodiments, the anhydrous monocalcium phosphate used as the starting material in the process has minimal amounts, i.e., less than 0.5 percent by weight of the starting composition of free acid and free lime.

Another embodiment of the present invention comprises a baking powder or baking mix for preparing an edible baked good including a leavening acid composition of matter produced by heating anhydrous monocalcium phosphate for a suitable time and at a suitable temperature so that the resulting composition contains between about 25 and about 72 percent by weight of $P_2O_7$.

The baking powder or mix may be used to prepare a cake, muffin, doughnut, bread, pastry, cookie, brownie, hush puppy, pancake, waffle, pizza crust or roll.

Yet another embodiment of the present invention is a leavening acid composition consisting essentially of:

(a) from about 1 to about 99 percent by weight of a composition produced by heating anhydrous monocalcium phosphate for a suitable time and at a suitable temperature so that the resulting composition contains between about 25 and about 72 percent by weight of $P_2O_7$; and (b) from about 99 to about 1 percent by weight of an additional leavening acid composition selected from the group consisting of monocalcium phosphate, monohydrate; monocalcium phosphate, anhydrous; coated monocalcium phosphate; sodium aluminum phosphate; a mixture of sodium aluminum phosphate with monocalcium phosphate; a mixture of sodium aluminum phosphate with aluminum sulfate; sodium acid pyrophosphate; sodium aluminum sulfate; potassium aluminum sulfate; ammonium alums; sodium alums; potassium alums; monosodium phosphate; monopotassium phosphate; tartaric acid; citric acid; adipic acid; fumaric acid; dimagnesium phosphate; monosodium dihydrogen phosphate; dicalcium phosphate dihydrate; monoammonium phosphate; monopotassium tartrate; and glucono-delta-lactone and mixtures thereof;

the sum of the weight percentages of (a) and (b) being 100.

Accordingly, it is an object of the present invention to provide a composition useful as a leavening acid which has excellent stability and release properties.

It is another object of the present invention to provide a process for producing the novel leavening acid composition.

It is yet another object of the present invention to provide a baking powder or baking mix using the novel leavening acid composition.

A further object of the present invention is to provide a novel blend leavening acid composition.

These, and other objects, will readily be apparent to those skilled in the art as reference is made to the detailed description of the preferred embodiment.

DETAILED DESCRIPTION OF THE PREFERRED EMBODIMENTS

In describing the preferred embodiment, certain terminology will be utilized for the sake of clarity. Such terminology is intended to encompass the recited embodiment, as well as all technical equivalents which operate in a similar manner for a similar purpose to achieve a similar result.

The main focus of the present invention is to develop leavening acid compounds which have desirable control release properties so that the acid would be released only when the proper time in the baking cycle takes place. More particularly, the liberation of carbon dioxide should take place either by an input of water to a baking mixture containing the leavening acid compound, by the elevation of temperature during heating or by the combined effect. Conversely, it is desired that the acid not prematurely release carbon dioxide gas during the preparation of the baking mix, or subsequent dough, for example, during the kneading phase, or while it is being stored prior to baking. The present invention accomplishes the above criteria by treating an anhydrous monocalcium phosphate leavening acid composition by heating it for a time and temperature so that the resulting material contains between about 25 and about 72 percent by weight of $P_2O_7$. The resulting material is also bland tasting and multifunctional.

The starting anhydrous monocalcium phosphate material has nearly all of its chemical groups containing phosphorus in an orthophosphate form ($PO_4$). The heat treatment according to the present invention results in the production of a composition containing phosphate groups in the form of orthophosphate, pyrophosphates ($P_2O_7$), and higher phosphates ($P_3O_{10}$, $P_4O_{13}$, and phosphates having more than four phosphorus atoms per functional group).

The amount of pyrophosphate groups is between about 25 to about 72 percent by weight of the resulting composition, more preferably between about 40 to about 70 percent by weight of the resulting composition and most preferably between about 50 to about 65 percent by weight of the resulting composition.

The amount of orthophosphate groups is between about 10 to about 60 percent by weight of the resulting composition, more preferably between about 15 to about 40 percent by weight of the resulting composition and most preferably between about 20 to about 35 percent by weight of the resulting composition.

The amount of higher phosphate groups is between about 0 and about 5 percent by weight of the resulting composition, more preferably between about 0.1 and about 2.0 percent by weight of the resulting composition. In the most preferred embodiments, the higher phosphate groups are polyphosphates of the formula $P_3O_{10}$ being present in between about 0.1 and about 2.0 percent by weight of the resulting composition.

The neutralizing value of the inventive composition is between about 50 and about 80. Particularly preferred compositions have a neutralizing value between about 64 and about 80, even more preferred between about 70 and about 80.

The Loss on Ignition (LOI) of the inventive composition is between about 7 and 14 percent, more preferably between about 10 and about 12 percent.

The anhydrous monocalcium phosphate starting material typically has a mean particle size of between about 20 and about 200 microns, with particle sizes ranging from about 30 to about 120 microns or from about 50 to about 200 microns being commercially available. Anhydrous monocalcium phosphate is produced by the reaction of phosphoric acid and calcium oxide, commonly referred to as lime. This reaction is well known.

However, most commercially available anhydrous monocalcium phosphate is produced wherein an exact stoichiometric amount of each reactant (i.e., $P_2O_5$:CaO) is not used. That is to say, a slight amount of excess phosphoric acid or an excess amount of lime is present in the composition. The inventors have discovered that it is preferred if the starting anhydrous monocalcium phosphate contains a minimal amount of either excess acid or excess lime. Using such a starting composition can yield a resulting leavening acid composition having a desirably high neutralizing value (i.e., between 64 and 80). In the preferred embodiment, the anhydrous monocalcium phosphate used as the starting material has less than 0.5% by weight of free acid or less than 0.5% by weight of free lime, and more preferably less than 0.1% by weight of either free acid or lime.

An alternative way to consider this phenomenon is to compare the weight ratio of $P_2O_5$ to CaO used to prepare the starting anhydrous monocalcium phosphate. A perfect stoichiometric ratio of each results in a weight ratio of 2.53. Excellent results are obtained when using starting anhydrous monocalcium phosphate having a ratio by weight of $P_2O_5$ to CaO of between about 2.42 to about 2.63.

The inventive composition is produced by heating anhydrous monocalcium phosphate at a temperature and for a time period suitable so that the resulting composition contains between about 25 and about 72 percent by weight of pyrophosphate. The heating step is simply accomplished by using any heat means known in the art such as using an oven, steam, either tossed air or convection type, a hot plate, fluidized bed rotary drum dryer and the like.

Heating conditions used generally involve the heating of the monocalcium phosphate starting material so that the material temperature reaches between about 200° C. to about 310° C. and the material is held at that temperature for a time period of between about 0.25 hours to about 30 hours. The heating temperature and time are selected to obtain the desired amount of conversion to pyrophosphate. For example, excellent product is produced when the temperature of the monocalcium phosphate starting material is heated to about 230–265° C., and the time of heating is between about 2 and about 5 hours.

After the anhydrous monocalcium phosphate starting material has been heated for the suitable amount of time, the resulting composition is cooled and stored under conditions so that the material does not absorb moisture. Particularly preferred storage conditions include watertight packaging or storage in the presence of a desiccant.

Once produced, the novel leavening acid compositions of the present invention may be incorporated in baking mixes for food products where the acids react with bases, typically sodium bicarbonate, to produce the leavening function that any known chemical leavening agent or biological leavener such as yeast would ordinarily provide.

The inventive chemical leavening system of this invention may be incorporated into a baking powder product conveniently prepared by admixing the acid with an base as a dry powder mix. It is well known that baking powders in the dry powder form are best prepared together with fillers contributing to the bulk of the powder and aiding its measurement for actual use. Fillers such as starch, calcium sulfate or calcium carbonate are generally employed in baking powders of this invention. Conventional preservatives and fillers may be employed together with the baking powder composition of this invention as is known in the art.

Examples of food products which can incorporate the inventive compositions, include, but are not limited to the following: cake, including layer and pound cake; muffin; doughnut; bread; pastry; cookie; room temperature, refrigerated or frozen dough; brownie; hush puppy; pancake; waffle; pizza crust or roll. The food products may be stored at room temperature or at reduced temperatures, e.g., refrigerated or frozen storage conditions.

In use, when the baking mixes are heated, the leavening acids, which typically comprise between about 0.2 to about 4.0 percent by weight of the mix, controllably release and react with the bases to produce a properly leavened food product. The use of the inventive heat treated monocalcium phosphate material provides a control release profile such that a particularly high quality leavened product is produced. The present invention enables the use of the inventive heat treated monocalcium phosphate alone as a leavening acid. This is a significant improvement as it contains no sodium, has a bland taste and reacts slowly enough to provided desired leavening properties.

Despite the fact that the inventive composition may be solely used as a leavening acid, specifically contemplated as falling within the scope of the present invention is a blend composition including the inventive leavening acid with one or more other leavening acids if the performance attributes of the other leavening acid would be desired. Other leavening acids which could be blended with the inventive composition, include, but are not limited to the following materials: monocalcium phosphate, monohydrate; monocalcium phosphate, anhydrous; coated monocalcium phosphate; sodium aluminum phosphate; a mixture of sodium aluminum phosphate with monocalcium phosphate; a mixture of sodium aluminum phosphate with aluminum sulfate; sodium acid pyrophosphate; sodium aluminum sulfate; potassium aluminum sulfate; ammonium alums; sodium alums; potassium alums; monosodium phosphate; monopotassium phosphate; tartaric acid; citric acid; adipic acid; fumaric acid; dimagnesium phosphate; monosodium dihydrogen phosphate; dicalcium phosphate dihydrate; monoammonium phosphate; monopotassium tartrate; and gluconodelta-lactone and mixtures thereof. When blends are used they preferably comprise between about 1 and 99 percent by weight of the inventive composition and between about 99 to 1 percent by weight of any of one or more of the above compositions.

Particularly efficacious results occur when blending the inventive heat treated anhydrous monocalcium phosphate with coated monocalcium phosphate, commercially sold under the name V-90 by Rhodia Inc. The respective amounts of each acid ranges from about 20 to about 80 parts inventive composition per 80 to 20 parts by weight coated monocalcium phosphate.

Fresh dough can be prepared from the leavening systems of this invention in the conventional manner as has been practiced in the art. Typically the ingredients are mixed together in the dry state and may be stored for conventional time periods. It is preferable to refrigerate dry mixed materials if extended time periods occur between mixing and the preparation of the fresh dough. The dry mix is employed to prepare fresh dough by incorporating suitable liquids such as milk and shortening materials as is known in the art.

As is known in the art, the desired pH of the final baked good can be controlled by incorporating into fresh dough leavening acids and alkaline carbonate sources normally employed for that purpose in the art. Generally, the pH of the final baked product ranges from about 5.5 to about 9.0, preferably from about 6.9 to about 7.5. The amount of alkaline carbonate material added should be sufficient to provide a pH within the above-described ranges. Typically there is included from about 0.3% by weight to about 3% by weight of the edible, alkaline agent, based upon the weight of the powdered ingredients employed.

The invention will be better understood by reference to the following examples.

EXAMPLE 1

Anhydrous monocalcium phosphate is produced by reacting phosphoric acid with calcium hydroxide and calcium oxide. The amount of each reactant used is carefully controlled so the anhydrous monocalcium phosphate formed has less than 0.5 percent by weight free acid and less than 0.5 percent by weight free lime. This material is fed to a rotary dryer which is heated until the temperature of the added material is between about 230 and about 265° C. and the material is maintained at this temperature for about 3 hours. The material is removed from the dryer, milled and screened for testing. This procedure is repeated several times and samples are examined for chemical analysis. The material has between about 15.8 to about 31.3 percent by weight of the final composition of orthophosphate (average amount of about 23.6 percent by weight), between about 50.0 to about 63.3 percent by weight of the final composition of pyrophosphate (average amount of about 54.0 percent by weight), between about 0.20 to 0.45 percent by weight of the final composition of tripolyphosphate (average amount of about 0.30 percent by weight) and trace amounts of tetra and higher than tetra polyphosphates.

The neutralizing value is measured by determining how many parts by weight of sodium bicarbonate are needed to neutralize 100 parts of this composition. The values measured range from about 65.6 to about 72.0.

Properties of Example 1 Composition

The dough rate of reaction (DRR) is a term that defines the speed of carbon dioxide evolved during mixing and holding of a dough prior to baking. It is determined by measuring the volume of carbon dioxide evolved from a standard dough formulation containing known quantities of leavening acid and baking soda under a constant temperature of 27° C. in a modified Chittick Apparatus. The DRR is often used as a guide for selecting the type of leavening acid that is best suited for a particular product application. A low value for the DRR, i.e., less than 50 over 2, 6 and/or 10 to 15 minute reaction times, tends to indicate an excellent controlled reaction rate.

To measure the amount of $CO_2$ liberated upon reaction with sodium hydrogen carbonate for the Example 1 composition, 73.5 parts of a simulated dry dough mix containing flour, nonfat dry milk, salt and shortening, 0.75 parts of $NaHCO_3$ and 0.93 parts of the Example 1 composition are added to a reaction bomb. 43 parts of water are added and the contents are mixed. Using a modified Chittick Apparatus (or any similar apparatus which capable of measuring gas evolution) the amount of $CO_2$ evolved compared to the total amount available to be evolved (DRR) is measured at times of 1, 2, 4, 6, 8, 10, 12, 15, 20, 25, 30, 40, 50 and 60 minutes. The above experiment is repeated at a holding temperature of 5° C. The DRR values are listed in the following table.

| Time (minutes) | DRR (27° C.) | DRR (5° C.) |
| --- | --- | --- |
| 0 | 0.0 | 0 |
| 1 | 22.6 | 8.2 |
| 2 | 25.8 | 8.7 |
| 4 | 31.4 | 8.7 |
| 6 | 36.0 | 9.2 |
| 8 | 39.1 | 10.1 |
| 10 | 41.3 | 10.6 |
| 12 | 43.5 | 11.1 |
| 15 | 45.7 | 12.5 |
| 20 | 49.4 | 13.7 |
| 25 | 52.7 | 14.9 |
| 30 | 54.9 | 15.9 |
| 40 | 58.7 | 16.4 |

-continued

| Time (minutes) | DRR (27° C.) | DRR (5° C.) |
| --- | --- | --- |
| 50 | 61.1 | 17.4 |
| 60 | 62.8 | 18.3 |

The Loss on Ignition (LOI) is measured by utilizing a standardized test wherein a sample of the leavening acid is heated (ignited) in a crucible at 800° C. and determining the weight loss as a result of the ignition. The LOI of this material is between about 10.5 and about 11.5.

Formulation Data—Yellow Cake

To determine if the above Example leavening acid composition would work well in baking mixes, the following yellow cake mix is prepared:

| | |
| --- | --- |
| Cake Flour | 236.00 parts |
| Granulated Sugar | 280.84 parts |
| Shortening | 53.57 parts |
| Nonfat Dry Milk | 18.17 parts |
| Egg Yolk Solids | 22.89 parts |
| Egg White Solids | 9.20 parts |
| NaCl | 6.37 parts |
| Inventive Leavening Acid Composition | 9.0–13.0 parts |
| Sodium Bicarbonate | 5.66 parts |
| Pregelatinized Wheat Starch | 2.60 parts |
| Emulsifier | 5.00 parts |

A batter is made by adding to the mixture first, 170.00 parts of water, then 142.00 parts of water. The batter was immediately added to a baking dish and baked at 375° F. for 25 minutes to form a yellow cake.

To determine if the above batters could produce high quality cakes after baking, they were quantitatively analyzed by using the following criteria: Batter Specific Gravity, Cake Specific Volume and Cake pH. A Cake Specific Volume of 3.25 is considered commercially acceptable. The experiments are repeated except that the batter is held for time periods of 30 minutes, 60 minutes, 120 minutes and 24 hours before baking. The results are shown in the following table.

| Time | Specific Gravity | Cake Specific Volume | Cake pH |
| --- | --- | --- | --- |
| 0 minutes | 0.87 | 3.72 | 7.24 |
| 30 minutes | 0.87 | 3.72 | 7.28 |
| 60 minutes | 0.87 | 3.66 | 7.29 |
| 120 minutes | 0.87 | 3.61 | 7.31 |
| 24 hours | 0.87 | 3.34 | 7.37 |

The cakes are qualitatively analyzed for crust color, grain, symmetry and cracks. All samples evaluated yield excellent qualitative results except that the crown on the cake made after the batter is held for 24 hours is slightly dipped.

As a first comparison, the cake specific volume (at time=0) measured for a cake made with Regent 12XX, a monocalcium phosphate monohydrate material is 2.59 and a cake made with Levair, a sodium aluminum phosphate material is 3.55. Regent 12X and Levair are commercially available materials sold by Rhodia Inc.

Formulation Data—Biscuits

The inventive composition is tested for use as a leavening acid in biscuits. The formulation and procedure for preparing the biscuits are as follows:

A self-rising flour is prepared by mixing together 100 parts flour, 1.375 parts of baking soda, an amount of the inventive leavening acid calculated to fully neutralize the baking soda and 2.25 parts of NaCl. The self-rising flour is placed into a three quart Hobart bowl. Using a heavy stainless steel paddle, 12.7 parts of shortening are added and the mixture is mixed 5 minutes on Speed #1. 65.5 parts of cold milk are added to the flour—shortening blend and the mixture is mixed for 15 seconds at Speed #2. Dough is scraped from the sides and bottom of the bowl with the paddle and the dough is removed from the bowl. The dough is then rolled lightly into a ball, being sure it is completely dusted with the flour. Placing a rolling pin in the center of the dough, the dough is rolled once forward and then once backward. The dough is folded in half and turned at a 90° angle and rolled again as in the previous step. This folding and rolling step is repeated. Four biscuits are cut with a 2½ inch floured cutter and then immediately baked at 425° F. for 14 minutes.

This procedure is repeated except the biscuits, after cutting are held for time periods of 15 minutes and 30 minutes before baking. The specific volume and pH of the biscuits are shown in the following table. These values are comparable to those obtained for commercially successful leavening acids for this application.

| Hold Time | Specific Volume | pH |
| --- | --- | --- |
| 0 | 2.60 | 6.85 |
| 15 minutes | 2.69 | 6.90 |
| 30 minutes | 2.77 | 6.97 |

Qualitatively, the biscuits have a good crust color and acceptable crust surface and sidewall splitting.

EXAMPLE 2

A second inventive leavening acid composition is prepared by dry mixing 80 parts by weight of the Example 1 composition with 20 parts by weight of the commercial product sold by Rhodia Inc. as V-90, which is a coated anhydrous monocalcium phosphate. The neutralizing value of this composition is about 74.0 to about 74.9. The material has between about 40.6 percent by weight of the final composition of orthophosphate, about 41.5 percent by weight of the final composition of pyrophosphate, between 0.24 by weight of the final composition of tripolyphosphate and trace amounts of tetra and higher than tetra polyphosphates. The LOI of this material is between about 11.4 and about 12.2 percent.

EXAMPLE 3

A third inventive leavening acid composition is prepared by dry mixing 50 parts by weight of the Example 1 composition with 50 parts by weight of the commercial product sold by Rhodia Inc. as V-90, which is a coated anhydrous monocalcium phosphate. The neutralizing value of this composition is about 77.4 to about 77.8. The material has between about 54.6 percent by weight of the final composition of orthophosphate, about 26.3 percent by weight of the final composition of pyrophosphate, and about 0.15 by weight of the final composition of tripolyphosphate and trace amounts of tetra and higher than tetra polyphosphates. The LOI of this material is between about 12.7 and about 13.4 percent.

Testing of Example 2 and 3 Compositions

Testing is performed on the above compositions as is discussed in connection with the Example 1 composition.

| Time (minutes) | DRR (27° C.) Example 2 | DRR (5° C.) Example 2 | DRR (27° C.) Example 3 | DRR (5° C.) Example 3 |
|---|---|---|---|---|
| 0 | 0 | 0 | 0 | 0 |
| 1 | 21.2 | 6.8 | 22.9 | 6.8 |
| 2 | 24.2 | 7.8 | 26.9 | 7.8 |
| 4 | 33.1 | 8.3 | 39.2 | 8.8 |
| 6 | 39.7 | 9.3 | 51.6 | 9.5 |
| 8 | 43.2 | 9.8 | 54.9 | 10.3 |
| 10 | 45.0 | 10.7 | 56.7 | 11.2 |
| 12 | 47.0 | 11.7 | 57.8 | 12.2 |
| 15 | 49.2 | 13.2 | 59.3 | 13.7 |
| 20 | 55.6 | 15.1 | 60.3 | 16.6 |
| 25 | 58.5 | 17.1 | 61.4 | 19.1 |
| 30 | 60.3 | 19.1 | 62.7 | 21.5 |
| 40 | 62.1 | 22.0 | 64.1 | 25.4 |
| 50 | 65.2 | 23.9 | 65.4 | 28.3 |
| 60 | 66.8 | 24.4 | 66.1 | 30.3 |

| Time | Specific Gravity | Cake Specific Volume | Cake pH |
|---|---|---|---|
| 0 minutes | 0.86 | 3.74 | 7.23 |
| 30 minutes | 0.86 | 3.57 | 7.24 |
| 60 minutes | 0.86 | 3.60 | 7.26 |
| 120 minutes | 0.86 | 3.52 | 7.26 |
| 24 hours | 0.86 | 3.33 | 7.28 |

This cake performs comparably to the control at time=0 but its crown dips when held at 24 hours. The cake is not as superior as the cake of Example 1; it is speculated that this is caused by the increase in the DRR of the Example 2 composition as compared to the Example 1 composition.

Yellow Cake Data—Example 3

| Time | Specific Gravity | Cake Specific Volume | Cake pH |
|---|---|---|---|
| 0 minutes | 0.85 | 3.32 | 7.21 |
| 30 minutes | 0.85 | 3.36 | 7.17 |
| 60 minutes | 0.85 | 3.36 | 7.19 |
| 120 minutes | 0.85 | 3.35 | 7.17 |
| 24 hours | 0.85 | 3.24 | 7.19 |

The cakes produced using the Example 3 composition have a smaller volume than the control at all times and is inferior as compared to the cakes which use the Example 1 composition; it is speculated that this is caused by the increase in the DRR of the Example 3 composition as compared to the Example 1 composition.

Biscuit Testing

| Hold Time | Specific Volume Example 2 | pH Example 2 | Specific Volume Example 3 | pH Example 3 |
|---|---|---|---|---|
| 0 | 2.62 | 6.93 | 2.65 | 6.97 |
| 15 minutes | 2.75 | 6.96 | 2.67 | 6.90 |
| 30 minutes | 2.80 | 6.95 | 2.73 | 6.91 |

Qualitatively, the biscuits have a good crust color and acceptable crust surface and sidewall splitting.

Discussion of Data

The above data demonstrates that the resulting compositions which are the products obtained by heat treatment of anhydrous monocalcium phosphate so they contain between about 25 and about 72 percent by weight of pyrophosphate have excellent control release properties while producing cakes that have a high specific volume. These values correspond to compositions having a loss on ignition of between about 7 and 14%, with a loss of between about 10 and 12% being particularly preferred.

Moreover, they can be blended with other commercially available leavening acids, and in particular those which do not contain sodium or aluminum to yield compositions having an even higher neutralizing value.

In short, the present invention produces a versatile leavening acid composition which is easy to produce, minimizes health risks, is bland to the taste and does not require blending with other leavening acid materials.

Having described the invention in detail and by reference to the preferred embodiments thereof, it will be apparent that modifications and variations are possible without departing from the scope of the appended claims.

What is claimed is:

1. A composition of matter having a neutralizing value of between about 70 to about 80, wherein the neutralizing value is the amount by weight of sodium bicarbonate needed to neutralize 100 parts by weight of the composition, said composition is useful as a leavening acid, said composition produced by heating anhydrous monocalcium phosphate for a suitable time and at a suitable temperature so that the resulting composition contains between about 25 and about 72 percent by weight of $P_2O_7$, said anhydrous monocalcium phosphate having prior to heating, less than 0.5% by weight of free acid and less than 0.5% by weight of free lime.

2. The composition according to claim 1 wherein the resulting composition contains between about 40 to about 70 percent by weight of $P_2O_7$.

3. The composition according to claim 2 wherein the resulting composition contains between about 50 to about 65 percent by weight of $P_2O_7$.

4. The composition according to claim 1 having a loss on ignition of between about 7 to about 14 percent.

5. The composition according to claim 4 having a loss on ignition of between about 10 to about 12 percent.

6. The composition according to claim 1 wherein the temperature of said anhydrous monocalcium phosphate when heated is between about 200° C. and about 310° C. and wherein the time of heating is between about 0.25 and about 30 hours.

7. The composition according to claim 6 wherein the temperature of said anhydrous monocalcium phosphate when heated is between about 230° C. and about 265° C. and wherein the time of heating is between about 2 and about 5 hours.

8. The composition according to claim 1 further comprising an additional leavening acid composition selected from the group consisting of monocalcium phosphate, monohydrate; monocalcium phosphate, anhydrous; coated monocalcium phosphate; sodium aluminum phosphate; a mixture of sodium aluminum phosphate with monocalcium phosphate; a mixture of sodium aluminum phosphate with aluminum sulfate; sodium acid pyrophosphate; sodium aluminum sulfate; potassium aluminum sulfate; ammonium alums; sodium alums; potassium alums; monosodium phosphate; monopotassium phosphate; tartaric acid; citric acid; adipic acid; fumaric acid; dimagnesium phosphate; monosodium dihydrogen phosphate; dicalcium phosphate dihydrate; monoammonium phosphate; monopotassium tartrate; and glucono-delta-lactone and mixtures thereof.

9. The composition according to claim 8 wherein the amount of said additional leavening acid composition comprises between about 1 to about 99 percent of the total of said leavening acids in said composition.

10. The composition according to claim 1 wherein the anhydrous monocalcium phosphate prior to heating has less than 0.1% by weight of free acid or less than 0.1% by weight of free lime.

11. A process for producing a novel leavening acid composition having a neutralizing value of between about 70 to about 80, wherein the neutralizing value is the amount by weight of sodium bicarbonate needed to neutralize 100 parts by weight of the composition, said process comprising heating anhydrous monocalcium phosphate having, prior to heating, less than 0.5% by weight of free acid and less than 0.5% by weight of free lime for a suitable time and at a suitable temperature so that the resulting composition contains between about 25 and about 72 percent by weight of $P_2O_7$.

12. The process according to claim 11 wherein the temperature of said anhydrous monocalcium phosphate when heated is between about 200° C. and about 310° C. and wherein the time of heating is between about 0.25 and about 30 hours.

13. The process according to claim 11 wherein the temperature of said anhydrous monocalcium phosphate when heated is between about 230° C. and about 265° C. and wherein the time of heating is between about 2.0 and about 5.0 hours.

14. The process according to claim 11 wherein said anhydrous monocalcium phosphate prior to heating has less than 0.1% by weight of free acid and less than 0.1% by weight of free lime.

15. A baking powder or baking mix for preparing an edible baked good including a leavening acid composition of matter having a neutralizing value of between about 70 to about 80, wherein the neutralizing value is the amount by weight of sodium bicarbonate needed to neutralize 100 parts by weight of the composition, said composition produced by heating anhydrous monocalcium phosphate for a suitable time and at a suitable temperature so that the resulting composition contains between about 25 and about 72 percent by weight of $P_2O_7$, said anhydrous monocalcium phosphate having, prior to heating, less than 0.5% by weight of free acid and less than 0.5% by weight of free lime.

16. The baking powder or baking mix according to claim 15 which is used to produce a cake, muffin, doughnut, bread, pastry, cookie, room temperature, refrigerated or frozen dough, brownie, hush puppy, pancake, waffle, pizza crust or roll.

17. The baking powder or baking mix according to claim 15 wherein said composition of matter comprises between about 0.2 to about 4.0 percent by weight of said mix.

18. The baking powder or baking mix according to claim 16 further comprising an additional leavening acid composition selected from the group consisting of monocalcium phosphate, monohydrate; monocalcium phosphate, anhydrous; coated monocalcium phosphate; sodium aluminum phosphate; a mixture of sodium aluminum phosphate with monocalcium phosphate; a mixture of sodium aluminum phosphate with aluminum sulfate; sodium acid pyrophosphate; sodium aluminum sulfate; potassium aluminum sulfate; ammonium alums; sodium alums; potassium alums; monosodium phosphate; monopotassium phosphate; tartaric acid; citric acid; adipic acid; fumaric acid; dimagnesium phosphate; monosodium dihydrogen phosphate; dicalcium phosphate dihydrate; monoammonium phosphate; monopotassium tartrate; and glucono-delta-lactone and mixtures thereof.

19. The baking powder or baking mix according to claim 18 wherein the amount of said additional leavening acid composition comprises between about 1 to about 99 percent of the total of said leavening acids in said composition.

20. A composition of matter consisting essentially of:

(a) from about 1 to about 99 percent by weight of a composition having a neutralizing value of between about 70 to about 80, wherein the neutralizing value is the amount by weight of sodium bicarbonate needed to neutralize 100 parts by weight of the composition, said composition produced by heating anhydrous monocalcium phosphate for a suitable time and at a suitable temperature so that the resulting composition contains between about 25 and about 72 percent by weight of $P_2O_7$, said anhydrous monocalcium phosphate having, prior to heating, less than 0.5% by weight of free acid and less than 0.5% by weight of free lime: and (b) from about 99 to about 1 percent by weight of an additional leavening acid composition selected from the group consisting of monocalcium phosphate, monohydrate; monocalcium phosphate, anhydrous; coated monocalcium phosphate; sodium aluminum phosphate; a mixture of sodium aluminum phosphate with monocalcium phosphate; a mixture of sodium aluminum phosphate with aluminum sulfate; sodium acid pyrophosphate; sodium aluminum sulfate; potassium aluminum sulfate; ammonium alums; sodium alums; potassium alums; monosodium phosphate; monopotassium phosphate; tartaric acid; citric acid; adipic acid; fumaric acid; dimagnesium phosphate; monosodium dihydrogen phosphate; dicalcium phosphate dihydrate; monoammonium phosphate; monopotassium tartrate; and glucono-delta-lactone and mixtures thereof;

the sum of the weight percentages of (a) and (b) being 100.

21. The composition according to claim 20 consisting essentially of about 20 to about 80 weight percent of (a) and between about 80 to about 20 weight percent of (b) wherein (b) represents coated monocalcium phosphate.

* * * * *